United States Patent [19]
Kanai et al.

[11] Patent Number: 5,754,339
[45] Date of Patent: May 19, 1998

[54] VIBRATION COMPENSATION DEVICE FOR BINOCULAR

[75] Inventors: Moriyasu Kanai; Yasuhiro Nishikata; Tetsuo Sekiguchi, all of Tokyo, Japan

[73] Assignee: Asahi Kogaku Kogyo Kabushiki Kaisha, Tokyo, Japan

[21] Appl. No.: 700,870

[22] Filed: Aug. 21, 1996

[30] Foreign Application Priority Data

Aug. 22, 1995 [JP] Japan .................. 7-213607

[51] Int. Cl.⁶ .............. G02B 27/64; G02B 23/00; G02B 5/04
[52] U.S. Cl. .............. 359/557; 359/554; 359/407; 359/837
[58] Field of Search .............. 359/554, 555, 359/556, 557, 407, 413, 414, 418, 835, 837

[56] References Cited

U.S. PATENT DOCUMENTS

| | | | |
|---|---|---|---|
| 3,915,550 | 10/1975 | Humphrey | 359/556 |
| 5,280,387 | 1/1994 | Maruyama | 359/554 |
| 5,461,513 | 10/1995 | Maruyama | 359/837 |

FOREIGN PATENT DOCUMENTS

| | | |
|---|---|---|
| 6-250099 | 9/1994 | Japan . |
| 6-250100 | 9/1994 | Japan . |
| 6-308431 | 11/1994 | Japan . |

*Primary Examiner*—Paul M. Dzierzynski
*Assistant Examiner*—Mark A Robinson
*Attorney, Agent, or Firm*—Greenblum & Bernstein P.L.C.

[57] ABSTRACT

A wedge prism unit is positioned on the optical axes of the objective optical systems of two telescope systems of a binocular. The wedge prism unit includes a front wedge prism element and a rear wedge prism element that are oppositely oriented. When rotated by equal amounts in opposite directions, the wedge prism elements deflect incident light in a direction perpendicular to the rotation axis. The wedge prism unit is placed along the objective optical axes of the binocular, oriented to deflect the visual field to compensate for vibration. A control circuit controls a single motor according to a vibration sensor to deflect the visual field in a direction opposite to the vibration. The rotation axis is either within or outside of an imaginary plane containing both of the optical axes.

20 Claims, 7 Drawing Sheets

VIBRATION COMPENSATION DEVICE FOR BINOCULAR

BACKGROUND OF THE INVENTION

The present invention relates to a vibration compensation device used in a binocular.

When using a binocular, vibration of the binocular causes the image being viewed (visual field) to vibrate. Devices that are designed to compensate for this vibration of the visual field are available.

Conventional vibration compensation devices include a vibration sensor and a compensating optical system. The vibration sensor is responsive to vibration of the binocular. The compensating optical system is placed along the optical path of the two telescope systems to deflect incident light in a direction opposite to the vibration movement. The vibration compensation device moves the compensating optical system to compensate for the vibration of the visual field.

One conventional compensating optical system uses wedge prisms. A wedge prism is an optical element formed having two substantially planar surfaces that act on incident light: a first surface that intercepts the path of the incident light, and a second surface that is inclined to the first surface by rotation about an imaginary axis perpendicular to the path of the incident light (wedge angle axis). The angle between the surfaces is the wedge angle. Two identical wedge prisms, oppositely oriented (the second wedge prism being rotated 180 degrees about the wedge angle axis with respect to the first wedge prism and facing the first wedge prism) and rotatable in opposite directions around a rotation axis parallel to the path of the incident light form a counter-rotating wedge prism unit. A counter-rotating wedge prism unit deflects incident light in a direction parallel to the wedge angle axis without any deflection of the incident light in a direction perpendicular to both the wedge angle axis and the path of the incident light.

One known vibration compensation device is disclosed in Japanese Patent Publication No. HEI 6-250099. The disclosure describes a vibration compensation device in which the compensating optical system is composed of four wedge prisms, two centered on each optical axis, and rotatable in opposite directions about the optical axes. The arrangement requires the use of multiple motors, sensors, and other components, and requires a complicated control system to synchronize the motions of the wedge prisms in each of the right and left telescope systems Other conventional vibration compensation devices are disclosed in Japanese Patent Publication Nos. 6-250100 and 6-308431. In Japanese Patent Publication No. 6-308431, the compensating optical system used is a prism-like optical device, shaped as a wedge, for which the wedge angle can be adjusted using a bellows system. In Japanese Patent Publication No. 6-250100, the compensating optical system used is a prism system attached to a gimbaled frame rotatable about an axis perpendicular to both the vibration direction and the optical axes. In both of these devices the compensating optical system is adjusted as a unit about an axis perpendicular to the optical axes of the binocular. Since the rotation axis is perpendicular to the optical axes, the compensating optical system and related drive mechanism require more space, resulting in a bulky and unwieldy binocular.

SUMMARY OF THE INVENTION

It is therefore an object of the present invention to provide an improved and compact vibration compensation device with a simple control mechanism to compensate for the vibration of the visual field.

All aspects of the invention are for use in a binocular having two telescope systems and a focusing mechanism. The two telescope systems each have an objective optical system, for example an objective lens (focusing lens). The objective lenses are on parallel optical axes and are adjusted by the focusing mechanism. A user of the binoculars observes a visual field when looking through the telescope systems.

According to one aspect of the invention, a vibration compensation device includes:

a vibration sensor responsive to vibration of the binocular along a vibration axis perpendicular to the optical axes;

a wedge prism unit, positioned on the optical axes, that includes a front wedge prism element and a rear wedge prism element;

a rotation axis, parallel to the optical axes, about which the front wedge prism element and the rear wedge prism element rotate;

a driving unit that rotates the front wedge prism element and the rear wedge prism element in opposite directions about the rotation axis; and a control circuit, responsive to the vibration sensor, that controls the driving unit to rotate the front wedge prism element and the rear wedge prism element about the rotation axis.

The use of a wedge prism unit, having only two wedge prism elements, intersecting the optical axes and having a single rotation axis inherently synchronizes the vibration compensation between the right and left telescope systems. Further, the arrangement allows a simpler control system and a simpler drive system resulting in a less expensive and less bulky design and easier construction.

In particular, the front wedge prism element has a first surface (or surfaces) perpendicular to the optical axes and a second surface (or surfaces) inclined to the first surface and parallel to the vibration axis. The rear wedge prism element has a third surface (or surfaces) perpendicular to the optical axes and a fourth surface (or surfaces) inclined to the third surface and parallel to the second surface of the front wedge prism element.

Thus, the front wedge prism element and the rear wedge prism element are oppositely oriented, identical prisms. That is, the rear wedge prism element is identical to the front wedge prism element but is rotated by 180 degrees about the vibration axis.

In one preferred embodiment, each of the first surface, the second surface, the third surface, and the fourth surface is formed as a substantially planar surface extending across the optical axes and through which the rotation axis passes.

Forming the front wedge prism element and the rear wedge prism element as simple prisms allows easier and cheaper manufacture of the prism elements.

In another preferred embodiment, each of the first surface (or surfaces) and the third surface (or surfaces) is formed as a substantially planar surface extending across the optical axes, and each of the second surface (or surfaces) and the fourth surface (or surfaces) includes two inclined surfaces corresponding to the objective optical systems, the two inclined surfaces being joined by a central part through which the rotation axis passes.

With this arrangement of surfaces the wedge prism elements are thinner along the optical axes allowing a more compact design.

Preferably, the front wedge prism element is unitarily formed and the rear wedge prism element is unitarily formed.

With any of these wedge prism unit arrangements, the visual field is deflected along the vibration axis according to the amount of rotation of the front wedge prism element and the corresponding opposite rotation of the rear wedge prism element.

In this way, the control circuit controls the driving unit to rotate the front wedge prism element and the rear wedge prism element according to the vibration sensor to deflect the visual field along the vibration axis opposite to the direction of vibration of the visual field to compensate for the vibration of the visual field.

Preferably, the vibration compensation device further includes a rotation sensor that detects the amount of rotation of the front wedge prism element and the corresponding opposite rotation of the rear wedge prism element so that the control circuit controls the driving unit in response to both the rotation sensor and the vibration sensor.

In a particular case, the vibration sensor is an angular velocity sensor that detects angular velocity along the vibration axis and the rotation sensor is a magneto-resistive (MR) sensor that detects the position of a permanent magnet on the main shaft.

In a preferred arrangement, the front wedge prism element and the rear wedge prism element are placed in front of (on the object side of) the objective lenses of the two telescope systems.

Preferably, the driving unit includes:

a driving mechanism that includes a motor and a gear mechanism;

a main shaft that is connected to the gear mechanism and is also connected to one of the front wedge prism element and the rear wedge prism element;

a reversing gear, connected to the main shaft, that reverses the driving direction of the main shaft; and an auxiliary shaft that is connected to the reversing gear and is also connected to the other of the front wedge prism element and the rear wedge prism element.

Preferably, the main shaft and the auxiliary shaft are coaxial and rotatable about the rotation axis.

The use of a single motor and a simple, in-line gear system simplifies the control system and minimizes the chances of break-down. Also, the main shaft and the auxiliary shaft provide a simple means of support for the wedge prism elements.

In yet another preferred embodiment, the rotation axis is within an imaginary plane containing both of the optical axes.

In still another preferred embodiment, the rotation axis is outside of an imaginary plane containing both of the optical axes. In this case, the rotation axis is preferably on the opposite side of the imaginary plane containing both of the optical axes from the focusing mechanism of the binocular.

The arrangement of the rotation axis opposite from the focusing mechanism frees the space between the optical axes for other uses allowing greater flexibility in optical design.

DETAILED DESCRIPTION OF THE PREFERRED EMBODIMENTS

Figure 1:
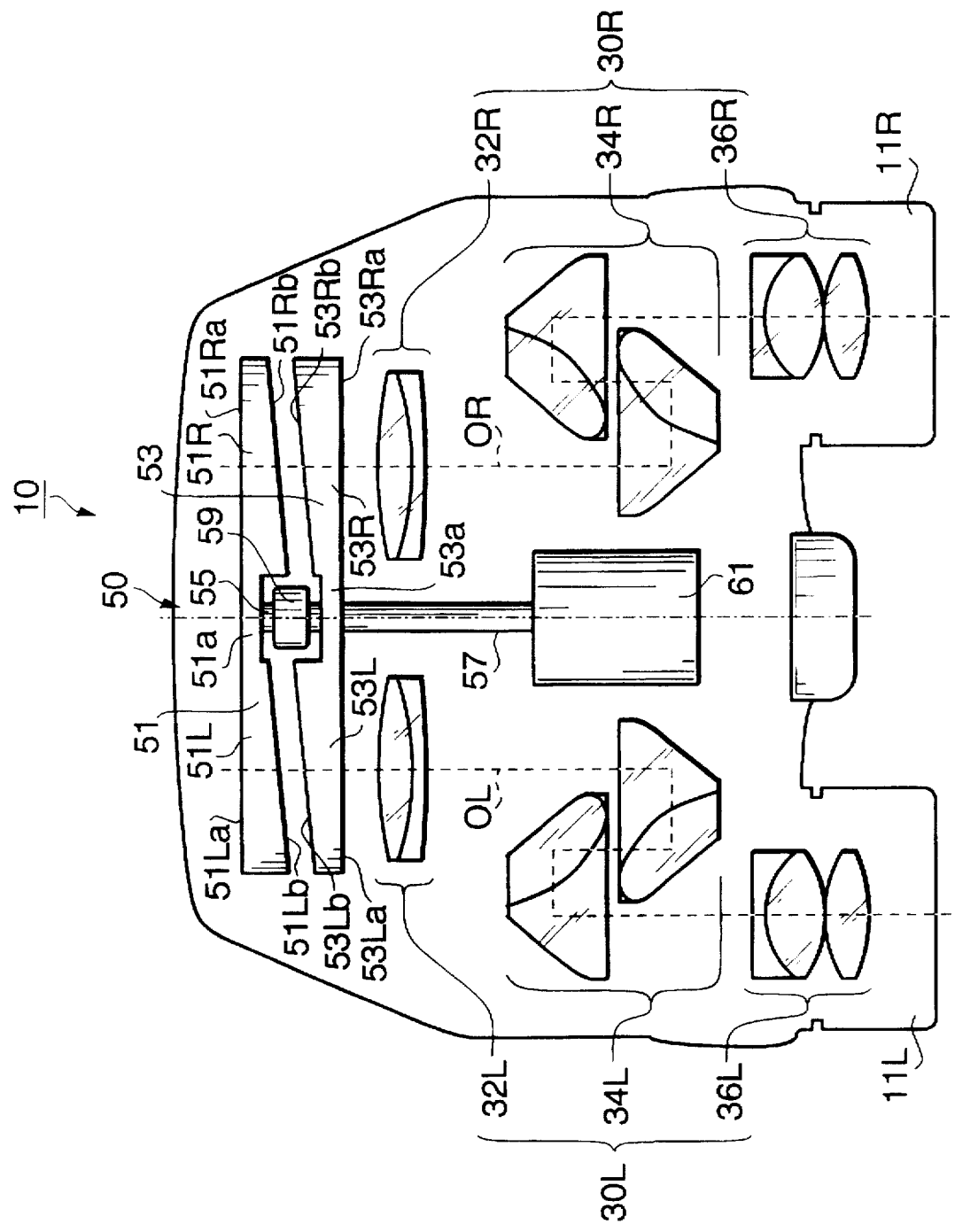
FIG. 1 is a plan view of a binocular to which a first embodiment of a vibration compensation device according to the invention is applied.

FIG. 1 is a plan view of a binocular 10 to which a first embodiment of a vibration compensation device 50 according to the invention is applied.

The binocular 10 includes two telescope systems, a right telescope system 30R and a left telescope system 30L.

The right telescope system 30R includes an objective optical system, for example objective lens (focusing lens) 32R, erecting prisms (Porro prisms) 34R, and an eyepiece lens 36R. The objective optical system (objective lens 32R) is on a right optical axis OR. Similarly, the left telescope system 30L includes an objective optical system, for example objective lens (focusing lens) 32L, erecting prisms (Porro prisms) 34L, and an eyepiece lens 36L, with the objective optical system (objective lens 32L) on a left optical axis OL.

The focusing lenses 32R, 32L are moved as a unit along the optical axes OR, OL by a focusing mechanism (not shown). The erecting prisms 34R, 34L and the eyepiece lenses 36R, 36L are contained in right and left lens barrels 11R, 11L. The lens barrels 11R, 11L are rotatably supported by a fixed central portion, and are rotatable about the central axis of the central portion (not shown) for interpupillary adjustment.

Figure 2:
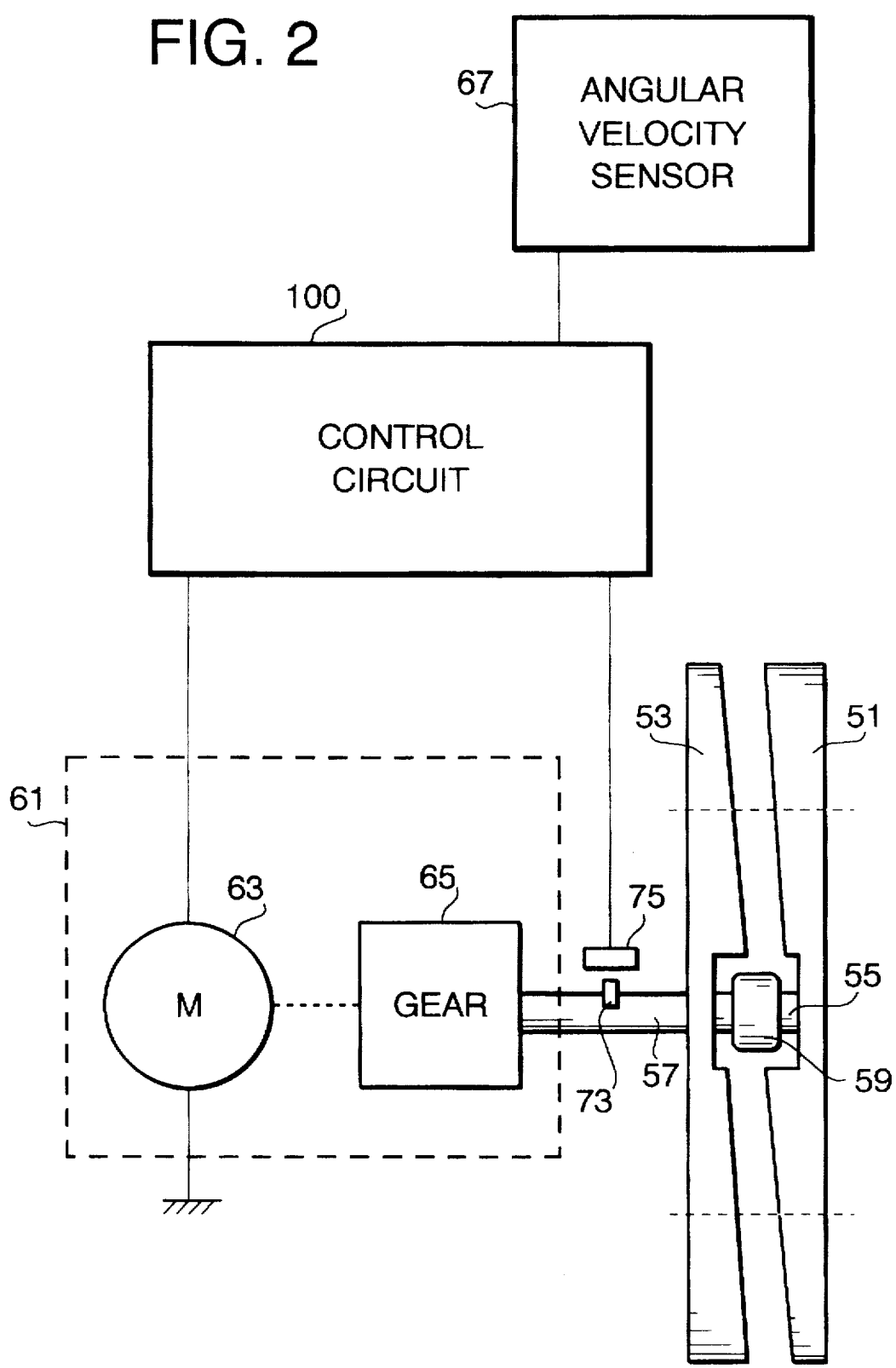
FIG. 2 is a general schematic view of the first embodiment of the vibration compensation device according to the invention.

FIG. 2 is a general schematic view of the first embodiment of the vibration compensation device according to the invention. With reference to FIG. 2, the vibration compensation device 50 includes a front wedge prism element 51, a rear wedge prism element 53, a main shaft 57, an auxiliary shaft 55, a reversing gear mechanism 59, and a driving mechanism 61.

The main shaft 57 and the auxiliary shaft 55 are coaxial and rotate about a rotation axis parallel to the optical axes OL, OR. In this embodiment the rotation axis is within an imaginary plane containing both of the optical axes OL, OR.

The driving mechanism 61 includes a motor 63 and a gear mechanism 65. The motor 63 drives the gear mechanism 65 and the gear mechanism 65 rotates the main shaft 57. The reversing gear mechanism 59 connects the main shaft 57 to the auxiliary shaft 55, reversing the direction of rotation Accordingly, the auxiliary shaft 55 rotates at the same speed as the main shaft 57, but in the opposite direction to the main shaft 57. The driving mechanism 61, the main shaft 57, the reversing gear mechanism 59, and the auxiliary shaft 55 make up the driving unit. The main shaft 57 has a permanent magnet 73 affixed thereto to be detected by a magnetaresistive (MR) sensor 75.

The rear wedge prism element 53 is fixed to the main shaft 57 and the front wedge prism element 51 is fixed to the auxiliary shaft 55.

Again referring to FIG. 1, the front wedge prism element 51 is formed (for example, formed unitarily) with a front right prism portion 51R, a front left prism portion 51L, and a front central part 51a. The central part 51a is the connecting point for the auxiliary shaft 55. Similarly, the rear wedge prism element 53 is formed (for example, formed unitarily) with a rear right prism portion 53R, a rear left prism portion 53L, and a rear central part 53a that is the connecting point for the main shaft 57.

The front wedge prism element 51 and the rear wedge prism element 53 are (for example) positioned in front of (on the object side of) the focusing lenses 32L, 32R. The front left prism portion 51L and the rear left prism portion 53L are positioned along the left optical axis OL, in front of the left focusing lens 32L. The front right prism portion 51R and the rear right prism portion 53R are positioned along the right optical axis OR, in front of the right focusing lens 32R.

The front left prism portion 51L is formed with a first surface 51La perpendicular to the left optical axis OL and a second surface 51Lb inclined with respect to the first surface 51La and parallel to the direction of the vibration to be compensated for (vibration axis). The rear left prism portion 53L is formed with a third surface 53La perpendicular to the left optical axis OL and a fourth surface 53Lb inclined with respect to the third surface 53La. The fourth surface 53Lb is further parallel to the second surface 51Lb.

Similarly, the front right prism portion 51R is formed with a first surface 51Ra perpendicular to the right optical axis OR and a second surface 51Rb inclined with respect to the first surface 51Ra and parallel to the vibration axis. The rear right prism portion 53R is formed with a third surface 53Ra perpendicular to the right optical axis OR and a fourth surface 53Rb inclined with respect to the third surface 53Ra and parallel to the second surface 51Rb.

In other words, the front wedge prism element is formed such that the first surfaces 51Ra, 51La form a substantially planar surface extending across the optical axes OR, OL and the second surfaces 51Rb, 51Lb are inclined, substantially planar surfaces joined by the front central part 51a. The rotation axis passes through the front central part 51a.

Similarly, the rear wedge prism element is formed such that the third surfaces 53Ra, 53La form a substantially planar surface extending across the optical axes OR, OL and the fourth surfaces 53Rb, 53Lb are inclined, substantially planar surfaces joined by the rear central part 53a. The rotation axis passes through the rear central part 53a.

The arrangement of the front wedge prism element 51 and the rear wedge prism element 53 is a counter-rotating wedge prism unit (as previously described) and therefore, depending on alignment (amount of opposite rotation), deflects the incident light, opposite to the direction of vibration, along the vibration axis (in this case vertically) by a predetermined amount.

The vibration compensation device 50 further includes a vibration sensor (in this case an angular velocity sensor) 67, a rotation sensor (in this case an MR sensor) 75, and a control circuit 100.

The angular velocity sensor 67 detects vibration of the binocular 10 along an axis perpendicular to the plane containing the optical axes OR, OL (i.e., along the vibration axis, in this case vertically). The MR sensor 75 detects the amount of rotation of the main shaft 57 by sensing the location of the permanent magnet 73.

The control circuit 100 controls the driving mechanism 61 in response to the angular velocity sensor 67.

Figure 3:
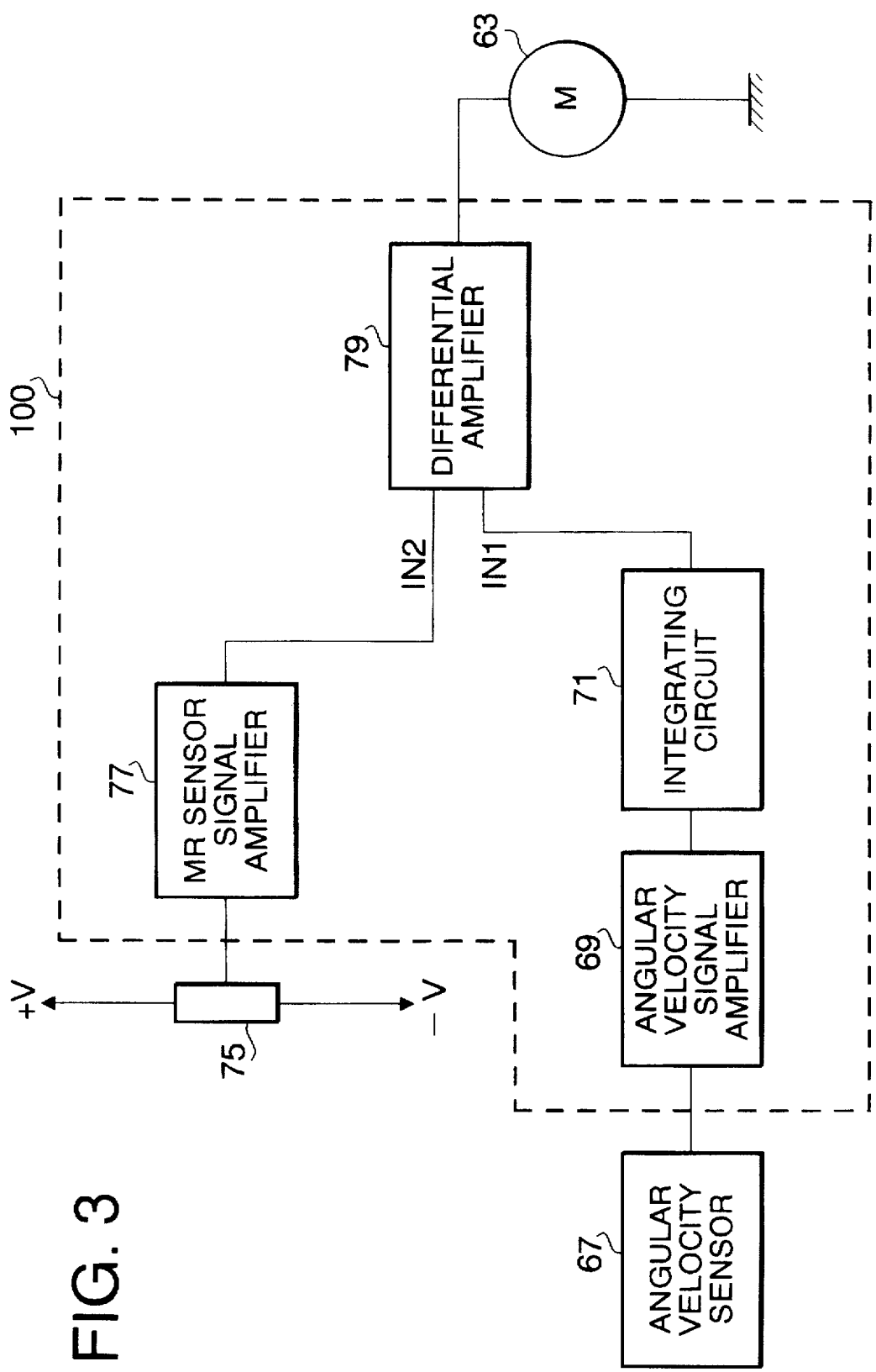
FIG. 3 is a schematic diagram of a control circuit of the first embodiment.

FIG. 3 is a schematic diagram of the control circuit 100 of the first embodiment according to the invention. With reference to FIG. 3, the control circuit includes an angular velocity signal amplifier 69, an integrating circuit 71, an MR sensor signal amplifier 77, and a differential amplifier 79.

The angular velocity signal amplifier 69 amplifies the signal from the angular velocity sensor 67 and sends it to the integrating circuit 71. The integrating circuit 71 integrates the signal and sends a signal to the differential amplifier 79, as a first signal IN1.

The MR signal amplifier 77 amplifies the signal from the MR sensor 75 and sends a signal to the differential amplifier 79, as a second signal IN2.

The differential amplifier 79 compares the values of the first signal IN1 and the second signal IN2 and is calibrated such that the signals are equal when the binocular is at rest. The output of the differential amplifier 79 controls the speed and direction of the motor 63.

In operation, the first signal IN1 is continuously generated following vibration detected by the angular velocity sensor 67. At the same time, the second signal IN2 is continuously generated following the amount of rotation of the main shaft 57 detected by the MR (magneto-resistive) sensor 75.

When the binocular 10 vibrates, the vibration causes a change in the signal output by the angular velocity sensor 67, and thus a change in the first signal IN1. The MR sensor 75, and accordingly the second signal IN2, are not affected by vibration and remain unchanged. The resulting difference, as amplified by the differential amplifier 79, drives the motor 63. The motor 63 rotates the front wedge prism element 51 and the rear wedge prism element 53. This rotation of the front wedge prism element 51 and the rear wedge prism element 53 deflects the incident light in a direction opposite to the vibration.

Subsequently, further vibration of the binocular causes further changes in the first signal IN1 and the front wedge prism element 51 and the rear wedge prism element 53 are rotated for subsequent compensation.

Figure 4:
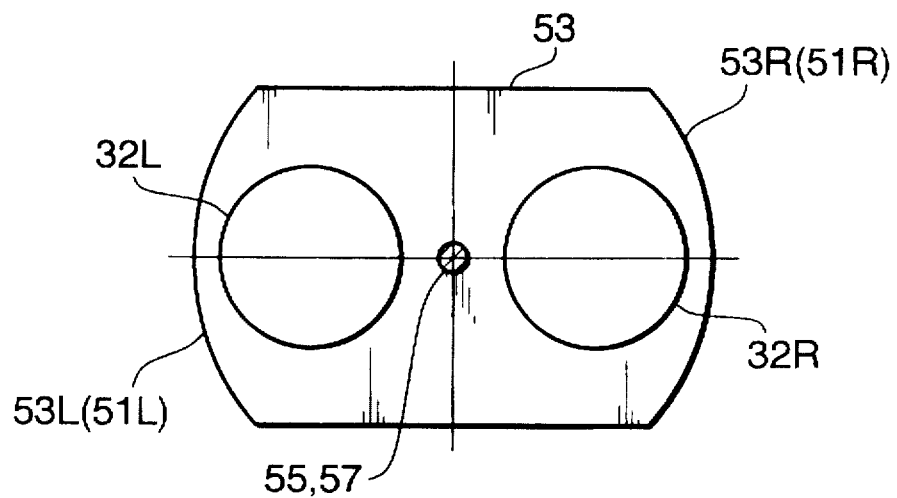
FIG. 4 shows an arrangement of the front wedge prism element and the rear wedge prism element of the first embodiment, seen from the eyepiece side, before a compensating movement.
Figure 5:
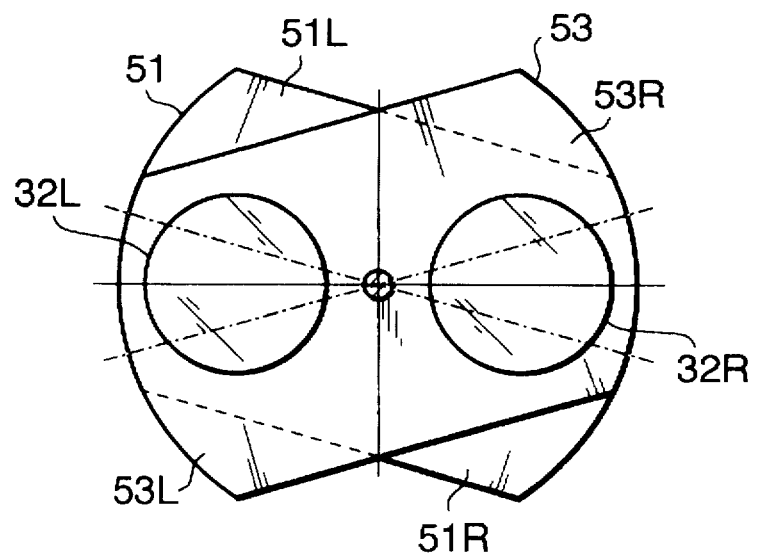
FIG. 5 shows an arrangement of the front wedge prism element and the rear wedge prism element of the first embodiment, seen from the eyepiece side, after a compensating movement.

FIGS. 4 and 5 show the arrangement of the front wedge prism element 51 and the rear wedge prism element 53, seen from the eyepiece side. Thus, the directions up, down, left, and right are defined relative to a user holding the binocular horizontal, and the optical axes are perpendicular to the page. FIG. 4 shows a condition before a compensating movement and FIG. 5 shows a condition after the main shaft 57 and the auxiliary shaft 55 are rotated in a compensating movement.

In the arrangement shown in FIG. 4, the front left prism portion 51L and the front right prism portion 51R deflect the incident light to the left. Also, the rear left prism portion 53L and the rear right prism portion 53R deflect the incident light to the right. Therefore, the net result is that the incident light is not deflected horizontally or vertically by the combination of the front wedge prism element 51 and the rear wedge prism element 53.

When the control circuit 100 operates the driving mechanism 61, the front wedge prism element 51 and rear wedge prism element 53 are rotated at the same speed in opposite directions resulting in (for example) the arrangement shown in FIG. 5. In the arrangement shown in FIG. 5, that is, when the front wedge prism element 51 is rotated clockwise and the rear wedge prism element 53 is rotated counterclockwise, the front left prism portion 51L and the front right prism portion 51R deflect the incident light to the left and up. At the same time, the rear left prism portion 53L and the rear right prism portion 53R deflect the incident light to the right and up. Here, the net result is that the right and left deflections cancel out, such that the light leaving the wedge prisms is deflected upward in relation to the incident light.

Similarly, when the front wedge prism element 51 is (for example) rotated counterclockwise and the rear wedge prism element 53 is rotated clockwise, the light leaving the wedge prisms is deflected downward.

In this way, the control circuit 100 controls the positioning of the front wedge prism element 51 and the rear wedge prism element 53 according to the angular velocity sensor 67 and the MR sensor 75 to deflect the incident light in a direction opposite to the direction of vibration of the binocular 10, thereby compensating for the vibration of the visual field.

Figure 6:
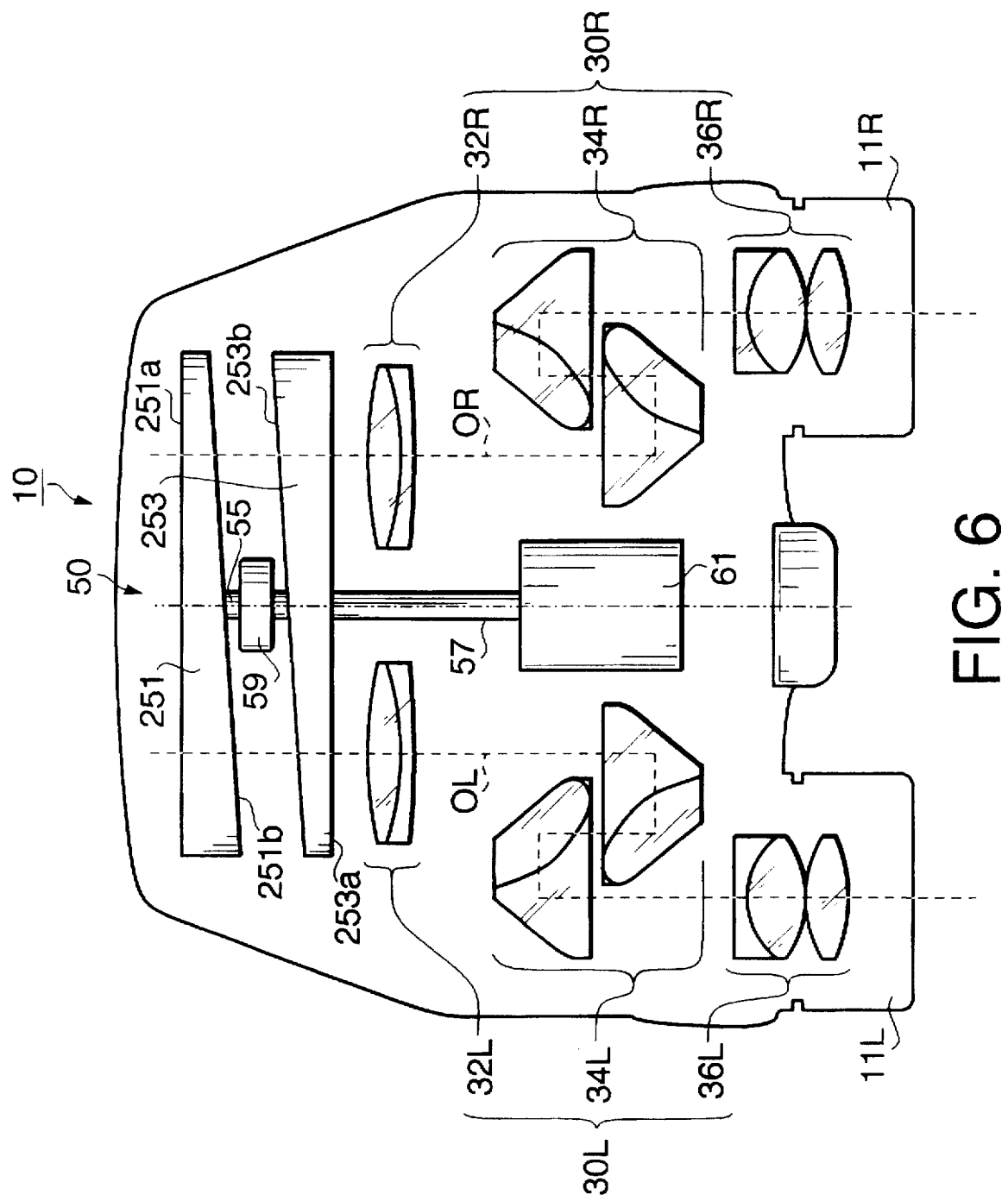
FIG. 6 is a plan view of a binocular to which a second embodiment of a vibration compensation device according to the invention is applied.

FIG. 6 is a plan view of the binocular 10 to which a second embodiment of the vibration compensation device 50 according to the invention is applied. With reference to FIG. 6, a front wedge prism element 251 is formed as a unit and a rear wedge prism element 253 is formed as a unit. In this embodiment, portions shown but not described and having reference numbers identical to the first embodiment have the same description and function.

The front wedge prism element 251 is fixed to the auxiliary shaft 55 and the rear wedge prism element 253 is fixed to the main shaft 57. The front wedge prism element 251 is formed with a first surface 251a perpendicular to the optical axes OR, OL and a second surface 251b inclined with respect to the first surface 251a and parallel to the vibration axis. Similarly, the rear wedge prism element 253 has a third surface 253a perpendicular to the optical axes OR, OL and a fourth surface 253b inclined with respect to the third surface 253a and parallel to the second surface 251b.

Further, the first surface 251a, the second surface 251b, the third surface 253a, and the fourth surface 253b are substantially planar surfaces that extend across the optical axes OR, OL and intersect the rotation axis.

Similar to the operation of the first embodiment, the control circuit 100 controls the front wedge prism element 251 and the rear wedge prism element 253 according to the angular velocity sensor 67 and the MR sensor 75 to deflect the incident light in a direction opposite to the direction of vibration of the binocular 10, thereby compensating for the vibration of the visual field.

The front wedge prism element 251 and the rear wedge prism element 253 of the second embodiment are easier to manufacture than the wedge prism elements of the first embodiment.

Figure 7:
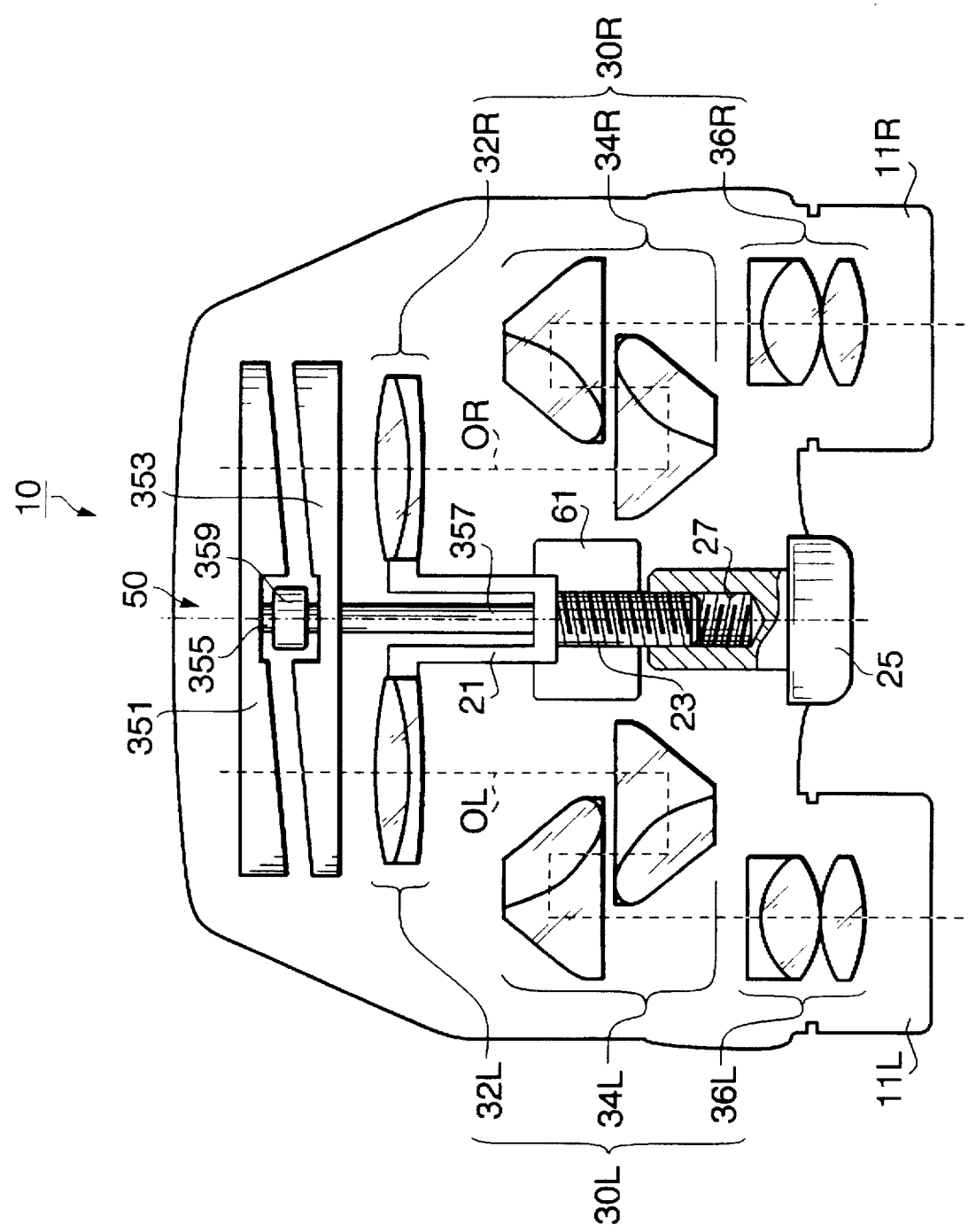
FIG. 7 is a plan view of a binocular to which a third embodiment of a vibration compensation device according to the invention is applied.

FIG. 7 is a plan view of a binocular 10 to which a third embodiment of a vibration compensation device 50 according to the invention is applied. In this embodiment, portions shown but not described and having reference numbers identical to the first embodiment have the same description and function.

With reference to FIG. 7, a main shaft 357 and an auxiliary shaft 355 are placed below an imaginary plane created by the right optical axis OR and the left optical axis OL.

Further, the binocular 10 has a focusing mechanism that includes a frame 21, a focus adjusting screw 23, a focus adjusting ring 25, and a nut 27. The frame 21 is connected to and guides the right focusing lens 32R and the left focusing lens 32L for movement along the optical axes OR, OL. The frame 21 is fixed to the focus adjusting screw 23. The focus adjusting screw 23 has a rear portion that engages with the nut 27 on the focus adjusting ring 25. Rotating the focus adjusting ring 25 drives the focus adjusting screw 23 parallel to the optical axes OR, OL, moving the right focusing lens 32R and the left focusing lens 32L.

Figure 8:
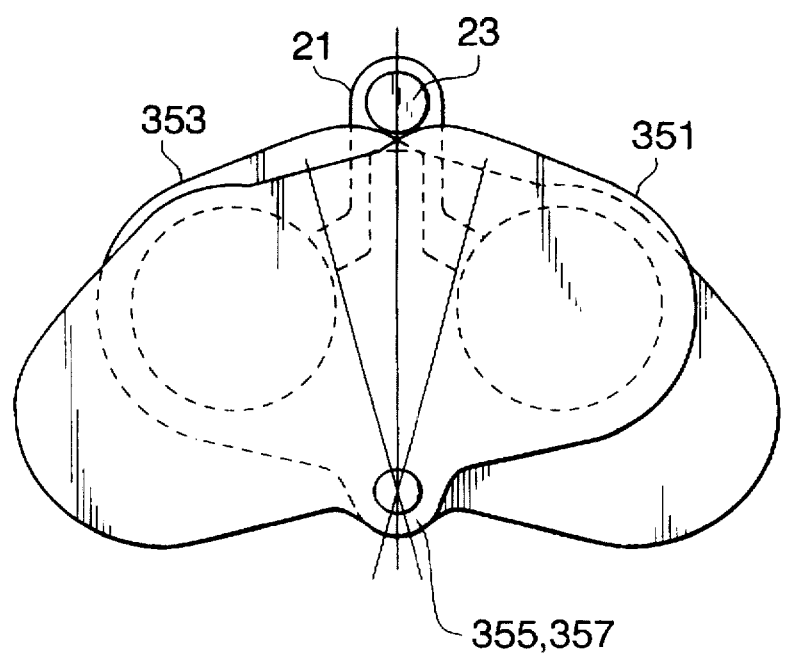
FIG. 8 shows an arrangement of the front wedge prism element and the rear wedge prism element of the third embodiment, seen from the eyepiece side, after a compensating movement.

FIG. 8 shows the front wedge prism element 351 and rear wedge prism element 353 of the third embodiment, seen from the object side. The main shaft 357 and auxiliary shaft 355 are below the imaginary plane containing the optical axes OL, OR.

In the third embodiment, since the main shaft 357 is below the imaginary plane containing the optical axes OL, OR, the main shaft 357 and the focus adjusting screw 23 are on opposite sides of the imaginary plane containing the optical axes OL, OR. Thus, the main shaft 57 and the focus adjusting screw 23 do not interfere with each other. This frees the space between the optical axes OL, OR for other uses, allowing greater flexibility in binocular design. In an alternative arrangement of this embodiment, the main shaft 357 is placed in another location outside the imaginary plane containing the optical axes OL, OR.

Similar to the operation of the first and second embodiments, the control circuit 100 controls the positioning of the the front wedge prism element 351 and the rear wedge prism element 353 according to the angular velocity sensor 67 and the MR sensor 75 to deflect the incident light in a direction opposite to the direction of vibration of the binocular 10, thereby compensating for the vibration of the visual field.

In the above embodiments, the refractive index of the wedge prism elements is 1.492, the wedge angle is 3.9 degrees, the maximum rotation of the wedge prism elements is ±15 degrees, and the compensation angle is ±1 degree. Using this refraction index and wedge angle, the front wedge prism element and the rear wedge prism element can provide compensation with a minimum of rotation. However, other combinations may be used.

Although the structure and operation of a vibration compensation device is described herein with respect to the preferred embodiments, many modifications and changes can be made without departing from the spirit and scope of the invention.

In one alternative arrangement, the front wedge prism element and the rear wedge prism element are each turned 180 degrees about an axis parallel to the vibration axis such that they remain oppositely oriented.

In another alternative arrangement, the front wedge prism element and the rear wedge prism element are formed so that their wedge shapes are rotated by 90 degrees (about an axis parallel to the optical axis) with respect to the wedge prism elements in the embodiment such that they compensate for horizontal, rather than vertical, vibration. Similarly, by using two wedge prism units, both horizontal and vertical vibration can be compensated for.

In a further alternative arrangement, the wedge prism unit is placed at a different location along the telescope system. Examples of alternative locations are behind (eyepiece side of) the focusing lenses 32R, 32L or erecting prisms 34R, 34L, or in front of (objective side of) the eyepiece lenses 36R, 36L.

Since the front wedge prism element and the rear wedge prism element are driven by the same motor, the front and rear wedge prisms are inherently synchronized with each other and with respect to each of the right and left telescope systems. This synchronization is achieved using minimal control elements and drive components resulting in a smaller and less expensive, vibration compensating binocular.

The present disclosure relates to subject matter contained in Japanese patent application No. HEI 07-213607, filed on Aug. 22, 1995, which is expressly incorporated herein by reference in its entirety.

What is claimed is:

1. A vibration compensation device for a binocular, said binocular having two telescope systems, said two telescope systems each having an objective optical system, said objective optical systems having parallel optical axes, said vibration compensation device comprising:

a vibration sensor responsive to vibration along a vibration axis perpendicular to the optical axes;

at least one first surface perpendicular to said optical axes and at least one second surface inclined to said at least one first surface and parallel to said vibration axis, said at least one first surface and said at least one second surface being surfaces of a front wedge prism element positioned on said optical axes;

at least one third surface perpendicular to said optical axes and at least one fourth surface inclined to said at least one third surface and parallel to said at least one second surface of said front wedge prism element, said at least one third surface and said at least one fourth surface being surfaces of a rear wedge prism element positioned on said optical axes;

a rotation axis, parallel to said optical axes, about which the front wedge prism element and the rear wedge prism element rotate;

a driving unit that rotates said front wedge prism element and said rear wedge prism element in opposite directions about said rotation axis; and a control circuit, responsive to said vibration sensor, that controls said driving unit to rotate said front wedge prism element and said rear wedge prism element about said rotation axis, wherein both of said parallel optical axes pass through each of said front wedge prism element and said rear wedge prism element.

2. The vibration compensation device according to claim 1, wherein said driving unit comprises:

a driving mechanism, said driving mechanism comprising a motor and a gear mechanism;

a main shaft connected to said gear mechanism and to one of said front wedge prism element and said rear wedge prism element;

a reversing gear connected to said main shaft to reverse a driving direction of said main shaft; and an auxiliary shaft connected to said reversing gear and to the remaining one of said front wedge prism element and said rear wedge prism element.

3. The vibration compensation device according to claim 2, wherein each of said main shaft and said auxiliary shaft are coaxial and rotatable about said rotation axis.

4. The vibration compensation device according to claim 3, wherein said rotation axis is within an imaginary plane containing both of said optical axes.

5. The vibration compensation device according to claim 3, wherein said rotation axis is outside of an imaginary plane containing both of said optical axes.

6. The vibration compensation device according to claim 5 wherein said binocular further includes a focusing mechanism, said rotation axis being on an opposite side to said focusing mechanism of said binocular of said imaginary plane containing both of said optical axes.

7. The vibration compensation device according to claim 1, wherein a visual field of said two telescope systems is deflected along said vibration axis in accordance with an amount of said rotation of said front wedge prism element and said rear wedge prism element in opposite directions, and wherein said control circuit controls said driving unit to rotate said front wedge prism element and said rear wedge prism element in accordance with said vibration sensor to deflect said visual field in a direction opposite to a vibration of said visual field to compensate for said vibration of said visual field.

8. The vibration compensation device according to claim 7, further comprising a rotation sensor for detecting an amount of said rotation of said front wedge prism element and said rear wedge prism element in opposite directions to each other, and wherein said control circuit controls said driving unit in response to both said rotation sensor and said vibration sensor.

9. The vibration compensation device according to claim 8, wherein said rotation sensor is a magneto-resistive sensor.

10. The vibration compensation device according to claim 1, wherein said vibration sensor is an angular velocity sensor that detects angular velocity along said vibration axis.

11. The vibration compensation device according to claim 1, wherein each of said at least one first surface, said at least one second surface, said at least one third surface, and said at least one fourth surface is formed as a substantially planar surface extending across said optical axes and through which said rotation axis passes.

12. The vibration compensation device according to claim 1, wherein each of said at least one first surface and said at least one third surface is formed as a substantially planar surface extending across said optical axes, and wherein each of said at least one second surface and said at least one fourth surface includes two inclined surfaces, each of said two inclined surfaces corresponding to one of said objective optical systems, said two inclined surfaces being joined by a central part through which said rotation axis passes.

13. The vibration compensation device according to claim 1, wherein said front wedge prism element is unitarily formed and said rear wedge prism element is unitarily formed.

14. The vibration compensation device according to claim 1, wherein each of said front wedge prism element and said rear wedge prism element are placed on the object side of the objective optical systems of said two telescope systems.

15. A vibration compensation device for a binocular with two telescope systems through which a visual field is viewed, said two telescope systems each having an objective optical system, said objective optical systems having parallel optical axes, said vibration compensation device comprising:

a vibration sensor for sensing vibration along a vibration axis perpendicular to said optical axes;

a wedge prism unit having two oppositely oriented wedge prism elements, both of said optical axes passing through each of said wedge prism elements, for deflecting the visual field when said two oppositely oriented wedge prism elements are rotated in opposite directions to each other about a rotation axis parallel to said optical axes;

a driving unit that rotates said oppositely oriented wedge prism elements; and a control circuit that controls said driving unit in response to said vibration sensor.

16. The vibration compensation device according to claim 15, wherein said oppositely oriented wedge prism elements deflect said visual field along said vibration axis, and said control circuit controls said driving unit to rotate said oppositely oriented wedge prism elements according to said vibration sensor to deflect said visual field in a direction opposite to a vibration of said visual field to compensate for said vibration of said visual field.

17. The vibration compensation device for a binocular according to claim 15, wherein said rotation axis is within an imaginary plane containing both of said optical axes.

18. The vibration compensation device according to claim 15, wherein said two oppositely oriented wedge prism elements are a front wedge prism element and a rear wedge prism element, said front wedge prism element formed having a central part and a wedge prism portion corresponding to each of said objective optical systems, each of said wedge prism portions having a first surface perpendicular to said optical axes and parallel to said vibration axis and a second surface inclined to said first surface and parallel to said vibration axis, said rear wedge prism element formed having a central part and a wedge prism portion corresponding to each of said objective optical systems, said wedge prism portions having a third surface perpendicular to said optical axes and parallel to said vibration axis and a fourth surface inclined to said third surface and parallel to said second surface of said front wedge prism element.

19. The vibration compensation device according to claim 15, wherein said oppositely oriented wedge prism elements deflect said visual field along said vibration axis, and said control circuit controls said driving unit to rotate said oppositely oriented wedge prism elements in accordance with said vibration sensor to deflect said visual field opposite to a vibration of said visual field to compensate for said vibration of said visual field.

20. The vibration compensation device for a binocular according to claim 15, wherein said rotation axis is outside an imaginary plane containing both of said optical axes.

* * * * *